US008757224B2

(12) United States Patent
Treacy et al.

(10) Patent No.: US 8,757,224 B2
(45) Date of Patent: Jun. 24, 2014

(54) CONTAINER FOR FLUID (75) Inventors: Denis William Treacy, Ivanhoe (AU);
Lyndon Thomas Treacy, Long Island
City, NY (US)

(73) Assignee: Lynmarden Pty Ltd, Ivanhoe (AU)

( * ) Notice: Subject to any disclaimer, the term of this patent is extended or adjusted under 35 U.S.C. 154(b) by 386 days.

(21) Appl. No.: 13/140,118

(22) PCT Filed: Dec. 18, 2009

(86) PCT No.: PCT/AU2009/001658
§ 371 (c)(1),
(2), (4) Date: Jun. 16, 2011

(87) PCT Pub. No.: WO2010/069003
PCT Pub. Date: Jun. 24, 2010

(65) Prior Publication Data
US 2011/0248082 A1 Oct. 13, 2011

Related U.S. Application Data (60) Provisional application No. 61/174,158, filed on Apr. 30, 2009, provisional application No. 61/138,872, filed on Dec. 18, 2008.

(51) Int. Cl.
*B65B 3/04* (2006.01)
*F16N 31/00* (2006.01)

(52) U.S. Cl.
CPC .................................. *F16N 31/004* (2013.01)
USPC ............... 141/98; 184/1.5; 184/106; 220/573

(58) Field of Classification Search
USPC ..................... 141/1, 2, 98, 331; 184/1.5, 106; 220/571, 573, 676, 661, 601
See application file for complete search history.

(56) References Cited

U.S. PATENT DOCUMENTS 3,648,933 A  3/1972 Grotz
4,030,664 A  6/1977 Tisbo
(Continued)

FOREIGN PATENT DOCUMENTS

AU  1981071653  5/1982
AU  1998074952  12/1998
(Continued)

OTHER PUBLICATIONS

International Search Report, Jan. 27, 2010, Australian Patent Office.
(Continued)

*Primary Examiner* — Timothy L Maust
*Assistant Examiner* — Timothy P Kelly
(74) *Attorney, Agent, or Firm* — Warner Norcross & Judd LLP (57) ABSTRACT A container for fluid which includes: an inlet; and a catchment surface for draining the fluid from an exterior of the container into the container through the inlet when the container is in a prone condition, wherein the container is moveable from the prone condition to a carrying condition, and wherein the inlet is positioned so as to be elevated above a contained fluid when the container is in either the prone condition or the carrying condition. The container can include a collecting wall, wherein the collecting wall includes a flow obstacle for slowing a flow of the fluid on the exterior of the container. The flow obstacle can be provided by ribs on the catchment surface. The container can include an outlet adapted to substantially resist fluid flow when in the prone condition, and adapted to allow fluid flow when in a pouring condition for draining the fluid from the container.

10 Claims, 6 Drawing Sheets

(56) References Cited

U.S. PATENT DOCUMENTS

| | | | |
|---|---|---|---|
| 4,114,644 A | | 9/1978 | Piper |
| 4,301,841 A | * | 11/1981 | Sandow .......................... 141/98 |
| D264,180 S | * | 5/1982 | Bartz ........................... D15/152 |
| 4,488,584 A | | 12/1984 | Hestehave et al. |
| 4,881,650 A | | 11/1989 | Bartz |
| 5,285,824 A | * | 2/1994 | Krstovic ........................... 141/1 |
| 5,503,246 A | * | 4/1996 | Raboin et al. .................. 184/1.5 |
| 5,562,131 A | * | 10/1996 | Drawbaugh .................... 141/98 |
| 6,302,336 B1 | | 10/2001 | Brown |
| 6,874,549 B1 | * | 4/2005 | Williams ........................ 141/98 |
| 6,880,589 B2 | * | 4/2005 | Camoli ........................... 141/98 |
| 7,066,358 B2 | | 6/2006 | Monsalve |
| 8,210,389 B2 | * | 7/2012 | Treslo ........................... 220/571 |
| 2004/0256023 A1 | | 12/2004 | Camoli |

FOREIGN PATENT DOCUMENTS

| | | |
|---|---|---|
| AU | 1998085208 | 4/1999 |
| AU | 2005100874 | 2/2006 |
| AU | 2006100965 | 12/2006 |
| GB | 1416096 | 12/1975 |
| JP | 2004124612 | 4/2004 |

OTHER PUBLICATIONS

Japanese Office Action and translation of JP Application No. 2011-541026, dated Aug. 13, 2013.

* cited by examiner

CONTAINER FOR FLUID

FIELD

The present invention relates to containers for fluids (e.g., for water), and methods for collecting and containing fluids.

BACKGROUND

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Existing containers for fluids may be inconvenient to fill, unstable to carry and/or difficult to control when pouring. For example: a watering can may require additional use of a water tap and a hose to fill water into; or an oil can may require additional use of a funnel to fill with oil. A standard bucket generally has a body that is unstable when carrying, e.g., due to a moveable or pivoting handle.

It is desired to address or ameliorate one or more disadvantages or limitations associated with existing containers for fluid, or to at least provide a useful alternative.

SUMMARY

In accordance with the present invention, there is provided a container for fluid which includes:
- an inlet; and
- a catchment surface for draining the fluid from an exterior of the container into the container through the inlet to collect the fluid when the container is in a prone condition, wherein the container is moveable from the prone condition to a carrying condition, and wherein the inlet is positioned so as to be elevated above the collected fluid when the container is in either the prone condition or the carrying condition.

The present invention also provides a method for collecting and containing fluid, including:
- draining the fluid from an exterior of a container into the container through an inlet to form a contained fluid when the container is in a prone condition in which a first surface of the container provides a base for the container; and
- moving the container from the prone condition to a carrying condition in which a second surface of the container provides the base for the container, and in which the inlet is positioned so as to be elevated above the contained fluid.

The present invention also provides a container for fluid with a collecting wall that provides:
- a catchment surface for collecting the fluid incident upon the catchment surface with the container in a collecting condition; and
- a containing surface for containing the collected fluid with the container in a carrying condition.

In embodiments, the inlet can be positioned generally proximate an edge of the catchment surface.

The container can include a handle for moving the container from the prone condition to the carrying condition, wherein the inlet is positioned generally proximate the handle.

The prone condition can be generally transverse the carrying condition.

The catchment surface can include a flow obstacle for slowing a flow of the fluid on the exterior of the container. The catchment surface can include a flow guide for directing the fluid towards the inlet on the exterior of the container. The catchment surface can include ribs that provide the flow obstacle and/or the flow guide.

The catchment surface can include a catchment boundary for draining the fluid inward from at least one edge of the catchment surface. The catchment boundary can include a spill-way channel for draining residual fluid from the catchment surface away from the inlet when the container is in the prone condition, wherein the residual fluid lies on the catchment surface above the inlet when the container is in the prone condition.

The catchment surface can have a larger area than a base area of the container in the carrying condition. The container can be generally wedge-shaped, with the base area being larger than an opposed carrying end area.

The container can include an outlet configured to substantially resist fluid flow through the outlet when in the prone condition and the carrying condition, and configured to allow fluid flow through the outlet when in a pouring condition for draining the collected fluid from the container. The outlet can include a riser arranged so as to be elevated at least partially above the inlet in the prone condition, and so as to be lowered at least partially below the inlet in the pouring condition. The outlet can include a nozzle having a nozzle entrance in fluid communication with an interior of the container and a nozzle exit in fluid communication with the exterior of the container, wherein the riser includes a raised portion between the nozzle entrance and the nozzle exit when the container is in the prone condition.

In embodiments, the method can include moving the container from the carrying condition to a pouring condition in which the inlet is positioned above the contained fluid and an outlet of the container is positioned below the contained fluid to allow the contained fluid to pour out of the container. The moving from the prone condition to the carrying condition and to the pouring condition can be manual moving by a user, and can include using a handle of the container, wherein the inlet is positioned generally proximate the handle. The draining can include slowing a flow of the fluid on the exterior of the container using a flow obstacle of the exterior of the container. The draining can include directing the fluid towards the inlet using a flow guide of the exterior of the container.

In embodiments, the handle is for carrying the container in the carrying condition. The handle can include an interior void for receiving the fluid in the prone condition. The handle can provide grips at opposed ends of the container, or can extend along a substantial length of the container, to provide substantial leverage for moving the container from the carrying condition to the pouring condition. The handle can be shaped to be held by a human grip. The container can include a hand grip in the base end of the container for moving the container from the carrying condition to the pouring condition. The hand grip can include a recess in a base at a base end of the container, the recess being sized for gripping manually, wherein the base end is an opposite end of the container to a handle end which includes the handle.

The catchment surface can be provided by a wall that also provides a containing surface for containing the contained fluid when the container is in the carrying condition.

The catchment surface can be on a collecting side of the container which includes a collecting wall. The collecting wall can include the flow obstacle for slowing a flow of the fluid on the exterior of the container. The ribs can be formed in the catchment surface by embossing of the collecting wall, by an altered texture of the collecting wall, by additional material on the collecting wall, or by an alternate material added to the collecting wall. The ribs can include elongate protrusions in the catchment surface. The ribs can lie at least partially transverse a flow direction of fluid on the catchment surface, the flow direction defined by a downward slope of the catchment surface in the prone condition. The collecting wall can include the flow guide for directing the fluid towards the inlet. The flow guide can also be provided by the ribs, and the ribs can lie at least partially along a preferred flow direction towards the inlet. The ribs can define a non-ribbed region in a central area of the catchment surface adjacent the inlet.

The catchment boundary can include a containing lip, e.g., formed by a collecting rim, on the collecting side of the container. The containing lip can at least partially surround the collecting wall. The containing lip can include the spillway channel for draining the residual, or excess or overflow, fluid from the catchment surface that lies above the inlet when the container is in the prone condition and the container has been filled to overflowing.

The base area of the container relates to the area of the lower end of the container in the carrying condition. For the generally wedge-shaped container, with the base area being larger than an opposed carrying end, the carrying end relates to the handle end, and the base width can be larger than the carrying end width to provide the wedge shape. The wedge shape aids flow direction during collection in the prone condition, and stability when stored in a standing position in the carrying condition.

The nozzle can define an outlet channel for fluid flow extending from below the fluid level to above the fluid level in the carrying position. The nozzle can include the riser provided by a raised portion of the outlet channel for substantially resisting fluid flow along the outlet channel when the container is in the prone condition. The riser can include the nozzle entrance arranged so as to be elevated above the fluid level in the prone condition. The riser can include the nozzle exit arranged above the fluid level in the prone condition. The nozzle can be connected to a body of the container by a web for supporting the nozzle. The outlet can include a closure mechanism for opening and closing the outlet. The closure mechanism can include a tap which is moveable between an open condition and a closed condition. The tap can be manually moveable. The tap can be a ball valve tap. The closure mechanism can include a moveable part of the outlet which is moveable so as to be elevated at least partially above the inlet in the prone condition, and so as to be lowered below the inlet in the pouring condition. The moveable part can include an outer opening of the nozzle, moveable by a deflection of a deflecting part of the nozzle. The mechanical closure and/or the position of the outlet can provide for at least a part of the outlet to be sufficiently above the contained fluid level in the prone condition, so that the outlet substantially resists conduction of the contained fluid during collection of the fluid. The arrangement of the outlet can generally prevents outflow through the outlet whilst filling with the container in the prone position.

The inlet can be provided by an aperture with a generally rectangular shape, or with a generally elliptical shape, or with a generally circular shape. The inlet can be positioned generally in a corner of the catchment surface, or generally centrally proximate an edge of the catchment surface. The inlet can be positioned sufficiently above the contained fluid level to substantially avoid spilling of the contained fluid out of the inlet during use, when the container is in the prone condition, the carrying condition and the pouring condition. The inlet can include a lip on the interior of the container to reduce spilling of the contained fluid out of the inlet when in the carrying condition and the pouring condition.

The container can include an interior with a support for resisting a deformation of the container by an external pressure. The support can be positioned and dimensioned to resist the deformation by a person standing on the container when in the prone position.

The container can include a filter system to filter the fluid. The filter system can include a porous filter, for example in the inlet, or in the body, or in the outlet, e.g., for filtering water or oil.

The container can include closures—e.g., seals, doors or taps—for the inlet and/or the outlet to aid storage and prevent spillage during transportation in the carrying condition.

The carrying condition and the pouring condition are generally upright conditions, also referred to as "upright" or "standing up" orientations. The prone condition is a collecting condition which includes a collecting orientation, also referred to as a "lying down" orientation. The carrying condition includes a carrying orientation. The carrying condition is also a storing condition in which the container is arranged for storing fluid, e.g., between collection of the fluid and pouring of the fluid. The pouring condition includes a pouring orientation. The prone condition is generally transverse, or perpendicular (or "orthogonal", or "at right angles") to, the carrying condition and the pouring condition.

The carrying condition is generally transverse, or perpendicular (or "orthogonal", or "at right angles") to, the prone condition. The base surface defines a footprint or base area of the container: the first surface, e.g., formed of a back wall and a back rim of the container, is larger than the second surface, e.g., a base wall of the container, thus providing a larger footprint in the prone condition for collecting fluid than the footprint required for carrying or storing of the container in the carrying condition.

As the prone condition is used for collecting fluid, and the carrying condition—which is also substantially the storing condition when the container is stored by setting it on the ground (or on a shelf or floor etc.)—is used for storage and carrying, a person can lay the container down to fill the container up with the fluid, and pick the container up (using the handle) to carry or store the contained fluid. Furthermore, the person can also pick up and tip the container to pour or drain the contained fluid from the container.

The fluid can be a liquid, e.g., water, and the container can be a watering can. The water can be collected under a shower. The fluid can be oil, or an oil mixture, and the fluid can be collected under a vehicle. The fluid can include particles, such as powder of grains or dust particles.

The container can have a maximum fluid storage volume of about 1 milliliter to 100 liters for convenient volumes, and of about 500 milliliters to 20 liters to allow manual carrying, and of about 1 liter to 10 liters to allow convenient manual carrying by a person and a convenient volume, e.g., for watering a garden.

BRIEF DESCRIPTION OF THE DRAWINGS

Preferred embodiments of the present invention are hereinafter further described, by way of example only, with reference to the accompanying drawings, which are not to scale, wherein.

DETAILED DESCRIPTION

Figure 1:
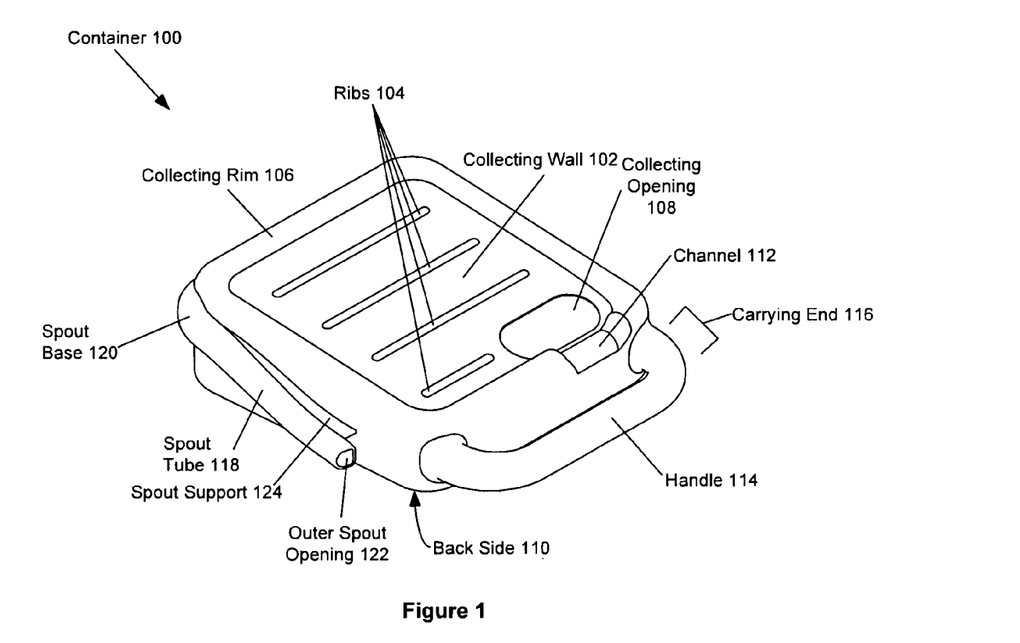
FIG. 1 is an auxiliary view from above of a container in a collecting orientation.

A fluid container 100, in a collecting orientation, as shown in FIG. 1, includes a catchment surface on an exterior of the container 100, formed by a collecting wall 102 with ribs 104 and a containing or collecting rim 106, which catches a fluid such as water or oil which falls incident upon the catchment surface. The catchment surface directs the fluid into the container 100 through an inlet in the form of a collecting opening 108, or an aperture or a hole, in the collecting wall 102.

Figures 3, 4, 5, 6, 7:
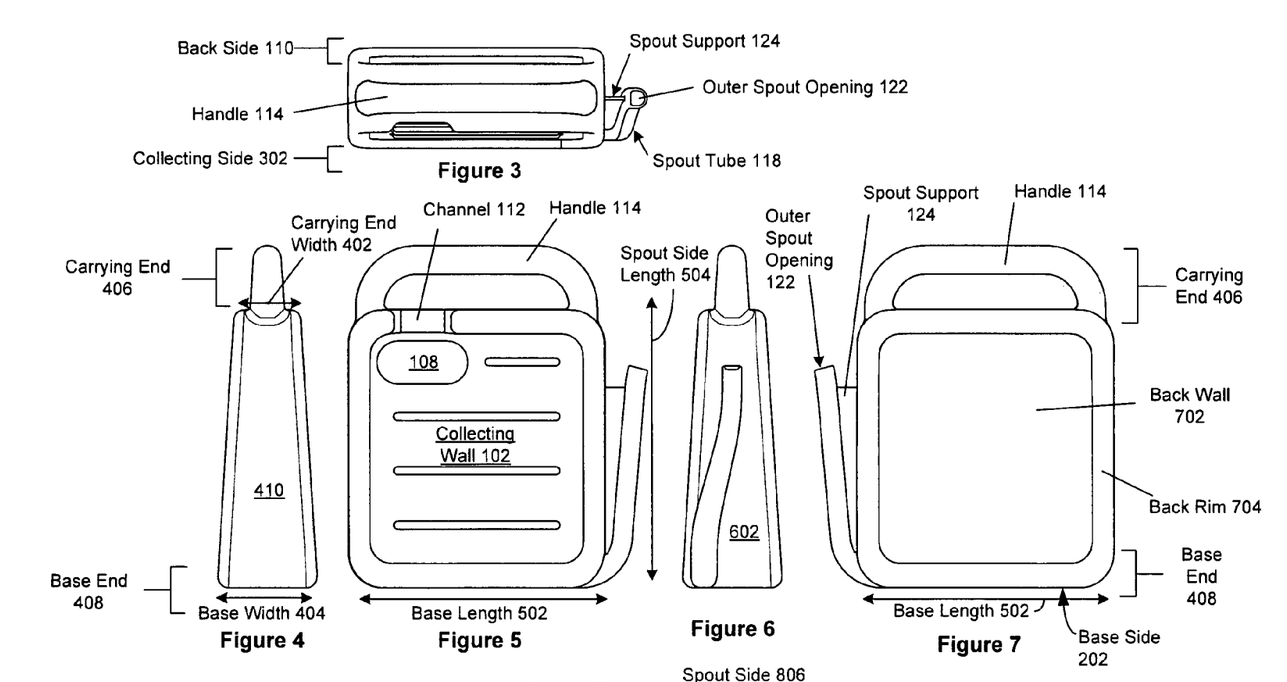
FIG. 3 is a carrying-end view of the container.
FIG. 4 is a non-spout-side view of the container.
FIG. 5 is a collecting-side view of the container.
FIG. 6 is a spout-side view of the container.
FIG. 7 is a back-side view of the container.

The catchment surface defines a collecting side 302 of the container 100, as shown in FIG. 3, which is on an opposite side to a back side 110 of the container 100. The container 100 rests on the back side 110 when in the collecting orientation, as shown in FIG. 1. When the container 100 is in the collecting orientation with the back side 110 on a generally level, non-sloping surface, the catchment surface slopes downward with respect to gravity towards the collecting opening 108 so that fluid falling on the catchment surface is directed to the collecting opening 108. An example non-sloping surface can include a floor under a shower in a bathroom, or a level drive-way or walk-way, etc.

The ribs 104 of the catchment surface provide a flow obstacle when the incident fluid is draining/pouring from the catchment surface into the collecting opening 108. The flow obstacle slows a flow of the fluid on the catchment surface. When the container 100 is in the collecting orientation, the ribs 104 lie (or "run") generally transverse (or "across") the downward sloping direction, and operate to reduce the speed and velocity of fluid flowing along the collecting wall 102 to the collecting opening 108, thus reducing overflow, or bouncing off of incident fluid from the catchment surface (particular due to fluid flowing into and hitting the collecting rim 106) and increasing the likelihood that incident fluid will be directed into the container 100 through the collecting opening 108 rather than flowing across the face of the collecting opening 108. The ribs 104 may be tapered in form, tapering from the catchment surface to a narrowing ridge at the outer edge of each rib 104, and/or tapering along their length across the catchment surface (e.g., being thicker and/or higher at one end than at the other) to guide the flow of the fluid.

The ribs 104 are formed by bumps, ridges or depressions in the collecting wall 102. The ribs 104 can be formed by embossing the collecting wall 102 (i.e., forming elongate outward curves of the collecting wall 102), by an altered texture of the collecting wall 102 (e.g., by forming depressed channels or lines in the collecting wall 102), by additional material on the collecting wall (e.g., thicker material for the ribs), or by an alternate material added to the collecting wall (e.g., ribs formed separately to other parts of the container 100, using alternate material—which can be the same type of material as the other parts of the container 100, or a different material—and added after formation of the collecting wall 102). In some embodiments, the ribs 104 can be broken or discontinuous, formed by isolated bumps, raised from or lowered into the catchment surface.

The collecting rim 106 acts as a lip to direct incident fluid towards the collecting wall 102 and to resist fluid flowing from the collecting wall 102 away from the collecting opening 108. The collecting rim 106 provides for an inset of the collecting wall 102 in the catchment surface, thus at least partially containing the incident fluid. The collecting rim 106 includes a spill-way (or "overflow") channel 112 which creates a part of the collecting rim 106 of reduced height above the face of the collecting wall 102 located generally adjacent the collecting opening 108 so that when placed in the collecting orientation, the fluid level defined by an overflow height defined by the spill-way channel 112 is not substantially above the collected fluid level defined by the position of the collecting opening 108: this ensures that only a small volume of fluid, if any at all, runs off the face of the catchment surface when the container 100 is moved from the collecting orientation into an upright orientation, even if the container 100 is filled to overflowing, as residual fluid that collects or temporarily lies on the catchment surface at a level above the collecting opening 108 (in the collecting orientation) is released from the catchment surface via the spill-way channel 112, as described further hereinafter with reference to FIG. 11. The spill-way channel 112 also limits the catchment of liquid to a specific volume, and unlike a standard bucket, prevents overfilling to ease carrying (e.g., the contained fluid is unlikely to splash out while the container 100 is being carried). Fluid flowing through the spill-way channel 112 acts as an indication that the container is full.

In embodiments, overflow height defined by the spill-way channel 112 is generally lower than or equal to a riser of the spout. The outlet includes the riser to resist collected fluid flowing out of the container 100 when the container is not in the pouring orientation. The outlet is configured to completely, or at least substantially, or at the very least generally, resist fluid flow through the outlet when the container 100 is in the collecting orientation, and when the container 100 is in the carrying orientation; however, the outlet is configured to allow fluid flow through the outlet when in a pouring orientation for draining the collected fluid from the container 100.

Figure 14A:
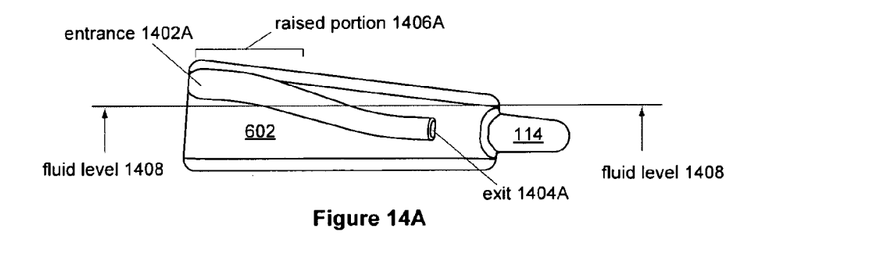
FIGS. 14A to 14E are spout-side views of the container with alternative spouts.
Figure 14B:
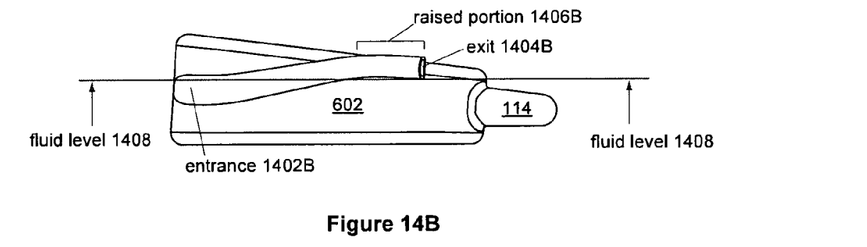
Figure 14C:
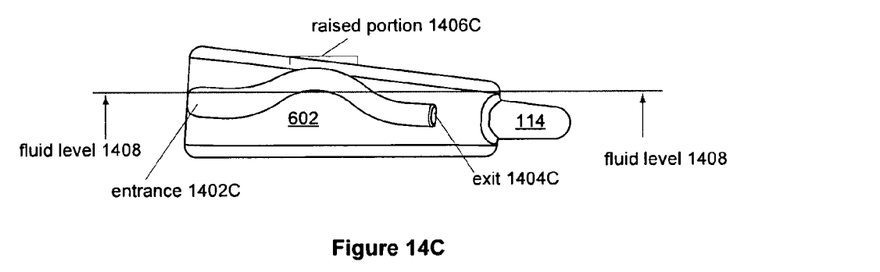

The riser is adapted to completely, or at least substantially, or at the very least generally, prevent fluid flowing out of the spout from the container 100 in the collecting orientation and the carrying orientation. The riser is provided by a raised portion, as shown in FIGS. 14A, 14B, 14C and 14E (when the spout is raised). In example embodiments, the riser includes a raised portion 1406A, as shown in FIG. 14A, which includes the inner spout opening 1006, and thus the inner spout opening 1006 is generally above the overflow height when the container 100 is in the collecting orientation. In alternative example embodiments, the riser does not include the inner spout opening 1006, but is formed elsewhere in the spout, as shown in FIGS. 14B, 14C and 14E (when the spout is raised).

In alternative embodiments, the height of the inner spout opening 1006 can define the overflow height by providing an alternative or an additional spill-way channel when the container is in the collecting orientation.

Figure 13:
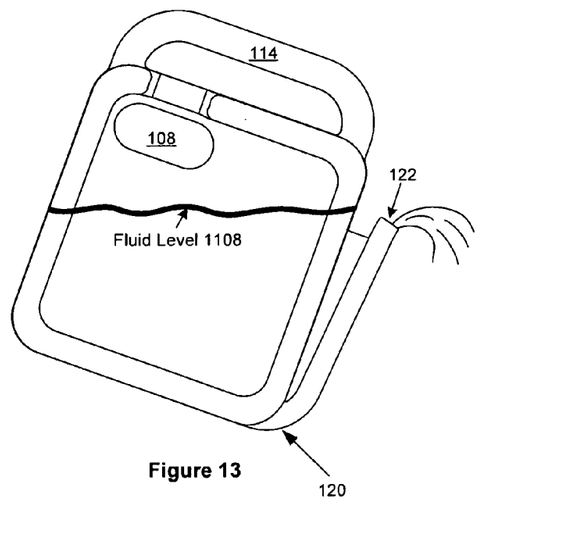
FIG. 13 is a schematic cross-sectional carrying-side view of the container in a pouring orientation showing pouring of the collected fluid.

The container 100 includes a handle 114 for grasping by a person's hand for positioning the container 100 in an area where fluid is likely to fall on the catchment surface, and for lifting or moving the container 100 from the collecting orientation to a carrying orientation, for carrying in the carrying orientation, and for moving or tipping into a pouring orientation in which fluid drains or pours from the container 100, as shown in FIG. 13. The collecting opening 108 is positioned or located, relative to the body of the container 100, generally proximate (i.e., near or close to) an edge of the catchment surface at a carrying end 406 of the container 100, as shown in FIG. 4, so that the inlet lies above the collected contained fluid when in one of the upright orientations. The carrying end 406 or "handle end" includes the handle 114.

Figures 9, 10:
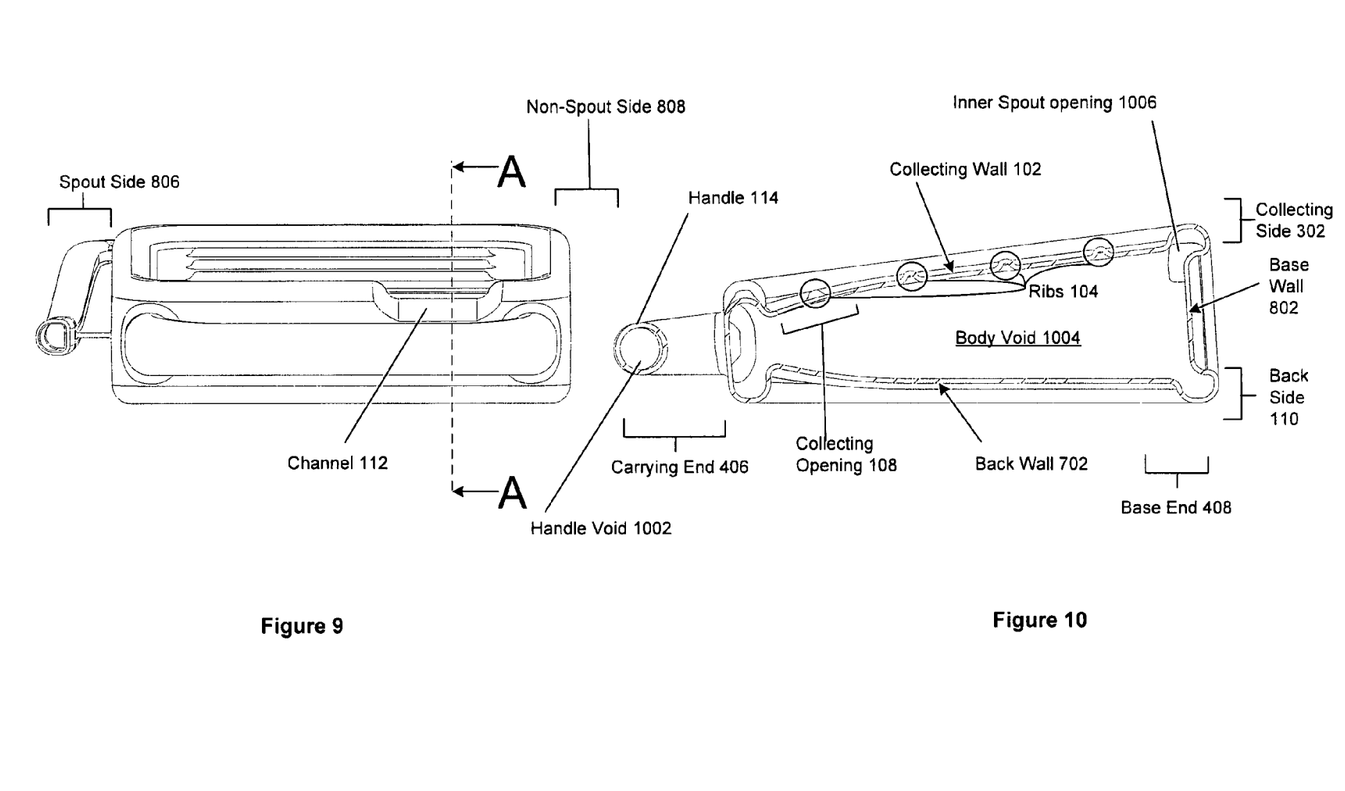
FIG. 9 is an auxiliary view from the carrying-end of the container in the collecting orientation.
FIG. 10 is a cross-sectional non-spout-side view of the container in the collecting orientation along the line marked A-A in FIG. 9.

The handle extends generally along the length of a carrying end 116 of the container 100 so that the person's hand can be positioned at different positions along the carrying end 116. The handle 114 is generally cylindrical along its body, and is hollow with a handle void 1002, as shown in FIG. 10, in fluid communication with a body void 1004 that contains the contained fluid in the body of the container 100.

The container 100 includes a fluid outlet in the form of a nozzle or 'spout', which includes a spout tube 118, a spout base 120 and an outer spout opening 122, as shown in FIG. 1. The spout defines an outlet channel for fluid flow from the container 100, i.e., the outlet channel carries, or guides, fluid through the fluid outlet.

Figure 11:
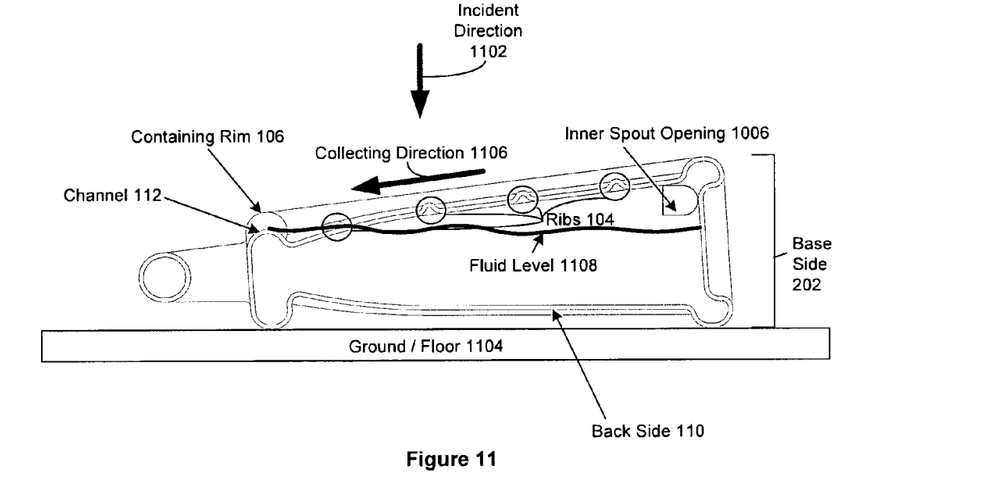
FIG. 11 is a schematic cross-sectional non-spout-side view of the container in the collecting orientation with contained collected fluid.

In embodiments, the spout base 120 may be offset from the centre of the container 100 generally above a contained or collected fluid level 1108, as shown in FIG. 11, thereby providing the raised portion 1406A, which is also referred to as a riser, or a projection or platform, in the nozzle. Alternatively, the riser may be formed as a "C"-shaped or "S"-shaped curve along the spout as shown in FIG. 14C. The height of the contained fluid level, when the container 100 has been filled, is defined by the height of the collecting opening 108 and the spill-way channel 112 when the container 100 is in the collecting orientation. Due to the riser, generally above the collected fluid level, very little fluid (or substantially no fluid, or no fluid at all) flows through the spout when the container 100 is in the collecting orientation.

Figure 8:
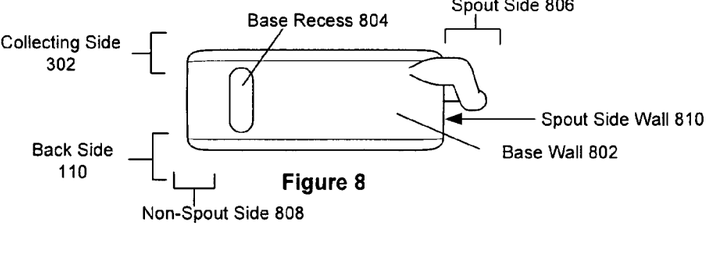
FIG. 8 is a base-end view of the container.

The spout is mechanically connected to, or integrated with, the body of the container 100 by a spout support 124 in the form of a web of material that allows the spout to project from a spout-side wall 810 on a spout side 806 of the main body of the container 100, as shown in FIG. 8, but still be securely attached to the container 100 along the length of the spout tube 118. The spout and spout support 124 can be moulded together with the container 100.

Figure 2:
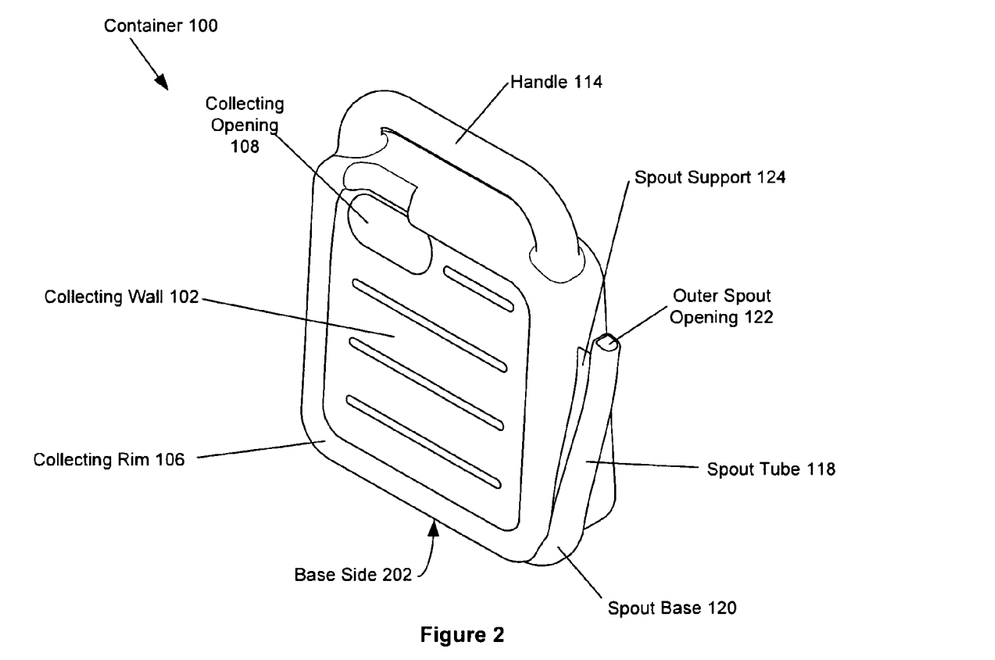
FIG. 2 is an auxiliary view from above of the container in a carrying orientation.
Figure 12:
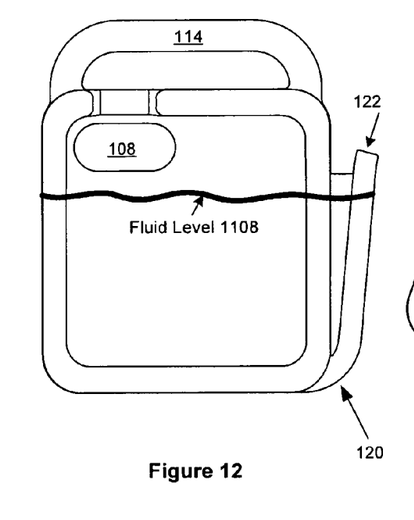
FIG. 12 is a schematic cross-sectional collecting-side view of the container in a carrying orientation with the collected fluid.

In the carrying orientation, as shown in FIG. 2, the handle 114 is provided at the upper end of the container 100 for convenient grasping and carrying, including picking up and setting down. The collecting opening 108 is raised above the collected fluid level 1108, and the outer spout opening 122 is also raised above the collected fluid level 1108. The spout base 120 is below the collected fluid level 1108, as shown in FIGS. 12 and 13. In the carrying orientation, the container 100 can be carried by the handle 114, or alternatively placed on a supporting surface, such as a ground or floor, to rest on a base side 202 of the container 100. In the carrying orientation, the contained fluid is held in the container by the cooperation of sealed walls that provide a containing surface, including the collecting wall 102, a back wall 702 as shown in FIG. 7, a base wall 802 as shown in FIG. 8, a spout-side wall 602 as shown in FIG. 6, and a non-spout-side wall 410 as shown in FIG. 4.

The handle 114, by being substantially rigidly fixed to the body of the container 100, provides for stable carrying, without substantial rocking or swaying that may lead to spilling or splashing of the contained fluid. Furthermore, having the handle 114 on a side of the container that is not the collecting side avoids the handle 114 acting to occlude or block the catchment surface, which could lead to splashing of the incident fluid away from the catchment surface by the handle 114, and/or spillage of the fluid onto the handle 114 (which may be undesirable, e.g., for a dirty or hazardous fluid such as oil or acid).

The container 100, as shown in FIG. 4, has a smaller carrying end width 402 than a base width 404 provided by a generally sloping nature of the back side 110 and the collecting side 302 from the narrower carrying end 406 to a wider base end 408—i.e., the transverse (or cross-sectional) base-end area is larger than the opposed transverse handle- or carrying-end area—thus a wedge shape of the container 100 is formed. This wedge shape provides for sloping of the catchment surface in the collecting orientation, i.e., sloping towards the collecting opening 108 generally proximate the carrying end 406. The wedge shape also provides a larger portion of the body void 1004 towards the base end 408, which lowers the centre of gravity of the container 100 when containing collected fluid in the upright orientations. The angle of sloping is slightly exaggerated to allow the surface to slope even when the container is placed on a sloped surface with the inlet orientated towards the higher ground, e.g., on the sloping surface of a bath tub.

The container 100, as shown in FIG. 5, includes a base length 502, which is generally the length from the spout side 806 to a non-spout side 808, opposite the spout side 806, as shown in FIG. 8, of the container 100. The base length 502 is substantially greater than the base width 404. The base width 404 defines the overall height of the container 100 in the collecting orientation, and it is desirable to have the base width 404 sufficiently small for the container 100 to be used in the collecting orientation to collect fluids dropping vertically from a position close to the ground or floor. The relatively smaller base width 404 provides for a low height in the collecting orientation. For example, the container 100 can be used in the collecting orientation to collect water from a water tap at a low height (from the ground or from a sink), or to collect oil falling from the underside of a car parked on the ground, or to fit under a low water tap or a downpipe carrying water from a roof (e.g., of a house or shed).

It is preferable to have the base length 502 substantially greater than the base width 404 to define a large catchment surface and collecting volume, as the collecting volume is at least partially defined by the base width 404 and the base length 502 (and a spout-side length 504, the handle volume, and the spout volume), and the catchment surface area is generally defined by the base length 502 (and the spout-side length 504). Having the spout-side length 504 and base length 502 generally larger than the base width 404 provides for a greater horizontal area of the container 100 in the collecting orientation than in the carrying orientation, thereby providing for a large catchment area for collecting fluid and a relatively smaller footprint for carrying and storage of the container. The relatively larger spout-side length 504 provides for a larger height for carrying or storage, making the container 100 easy for the person to manually pick up without bending too close to the ground or floor. The large catchment area allows for efficient collecting of fluid falling over the entire catchment area, such as water when it is raining, without requiring the container 100 to be too large for the person to carry. The large catchment area also allows for only approximate positioning of the container 100 under a fluid source in the collecting orientation, such as under an engine oil outlet underneath a vehicle when it is difficult to determine exactly where the engine oil outlet is. The large catchment area also allows for improved collection of fluids, e.g., water, that have a tendency to run along surfaces away from the opening that they are coming out of before releasing and falling, e.g., along the edges of a faucet or tap, due to a strong surface tension in these fluids and an insufficiently sharp-edged opening to break the surface tension.

The back side 110, as shown in FIG. 7, is defined by the back wall 702, generally corresponding in dimensions to the collecting wall 102 with no ribs or inlet, and a back rim 704, corresponding in dimensions to the collecting rim 106 with no spill-way channel. The back side 110 provides support for the container 100 in the collecting orientation by resting on the ground or floor. The back side 110 also provides a sealed side to seal fluid in the container 100, and is generally sloped from the base end 408 to the carrying end 406 in a symmetrical manner to the collecting side 302, as shown in FIGS. 4 and 6, thereby providing a generally wedge-shaped container 100.

The base side 202, as shown in FIG. 8, includes the base wall 802, for holding the fluid in the container 100, and a hand grip in the form of a base recess 804 in the base wall 802. The base recess 804 is dimensioned (or 'sized') to receive the person's hand or fingers, providing a grip on the base side 202 of the container 100 for manually operating the container 100 in conjunction with the handle 114. For example, when moving the container 100 in or into the pouring orientation, the person can use one hand for gripping or grasping the handle 114 and the other hand for gripping or grasping the base recess 804 for tilting the container 100 towards the spout side 806, thereby steadily moving fluid in the container 100 towards the spout away from the non-spout side 808 for pouring.

In some embodiments, the spout includes an inner spout opening 1006 or spout entrance 1402A, as shown in FIGS. 10 and 14A, which provides fluid communication between the spout and the body of the container 100 and is positioned generally above the contained fluid level 1108 in the container 100 in the collecting orientation as defined by the height of the collecting opening 108 and the spill-way channel 112 above the ground or floor, thus providing for very little, if any, flow of fluid from the container 100 out of the spout (through the spout opening 1006) when the container 100 is in the collecting orientation. In alternative embodiments, described below with reference to FIG. 14D, spillage of fluid out through the spout of the container 100 in the collected orientation can be resisted through use of a mechanical closure mechanism such as a tap in the spout, for example for selectively closing the outlet during collection of fluid, and carrying of fluid, and for opening the outlet during pouring. In further alternative embodiments, described below with reference to FIGS. 14A, 14B and 14C, flow of fluid out of the spout, when the container is in the collecting orientation, is resisted by a raised portion of the spout forming the riser.

In some embodiments, the inlet includes an inlet lip positioned on the interior of the collecting wall 102 at the edge of the inlet (e.g., formed by the collecting opening 108), further from the carrying end 406 for resisting or reducing splashing or spillage of the contained fluid out of the inlet when the container is in the upright orientations (i.e., collecting and pouring). In the upright orientations, the contained fluid can be temporarily raised relative to the container, e.g., by rough manual handling of the container while carrying, and the inlet lip directs the fluid being pushed upward preferably towards the back side 110 of the container, thus resisting spillage out of the inlet.

In alternative embodiments, the inlet includes a moveable sealable door for closing when the container is in the carrying orientation and the pouring orientation to reduce or substantially avoid any splashing or spillage of the contained fluid out of the inlet. The door is configured to be manually moveable between the closed position, and an open position in the collecting orientation. The door can be a sliding door mounted on, or underneath, the catchment surface (e.g., in the collecting wall 102).

In the collecting orientation, fluid strikes the catchment surface generally in an incident direction 1102, as shown in FIG. 11, for example fluid falling under the force of gravity onto the container 100 while the container 100 rests in the collecting orientation on the ground or floor 1104. The fluid, after striking the catchment surface, travels in a collecting direction 1106, defined by the slope of the collecting wall 102 and the collecting rim 106, towards the collecting opening 108, albeit slowed by the operation of the ribs 104. The slow-flowing fluid can create a layer on the catchment surface which aids in the catchment process by creating a fluid buffer layer that catches or collects the incident fluid which can otherwise splash or bounce away from the catchment surface.

The fluid collects in the body of the container (e.g., in the body void 1004 of container 100) with the collected fluid level 1108 generally defined by an overflow height (defined by the spill-way channel or the outlet height) in the collecting orientation, as shown in FIG. 11.

In the carrying orientation, the collected fluid level 1108 moves, under the force of gravity, to a position generally below the inlet and below the outer spout opening 122, as shown in FIG. 12.

In the pouring orientation, as shown in FIG. 13, the collected fluid level 1108 is held generally level by the force of gravity, while the container 100 is rotated to lower the outer spout opening 122 to be below the collected fluid level 1108 so that fluid flows out of the container 100, thereby draining the fluid from the container 100, for example for watering a plant.

The collecting opening 108 is positioned generally towards the non-spout side 808 of the container 100, or at least centrally along the carrying end 406, to generally prevent fluid spilling out of the container 100 through the collecting opening 108 when in the pouring orientation. As shown in FIG. 13, the collecting opening 108 is above the contained or collected fluid level 1108 defined by the height of the outer spout opening 122 in the pouring orientation, with an additional height above the collected fluid level 1108 to avoid spillage when the container 100 is moved suddenly to a more angled pouring orientation (e.g., by sudden rotation of the container 100 to the pouring orientation) whereby the collected fluid level 1108 will temporarily be above the height defined by the outer spout opening 122 in the pouring orientation. In embodiments, the collecting opening 108 can be positioned proximate or closer to the non-spout side 808 than the spout side 806.

In some embodiments, the container 100 can include internal support, such as struts or ribs, for holding the collecting wall 102 and the back wall 702 generally in position relative to each other, for resisting outward forces on the collecting wall 102 and the back wall 702 (e.g., caused by a pressure of the contained fluid volume), and for resisting inward forces on the container 100 (e.g., caused by a pressure on the collecting wall 102 when in the collecting orientation, such as from a heavy volume of liquid incident in the incident direction 1102 on the collecting wall 102, or the weight of a person standing on at least part of the catchment surface).

In embodiments, the container 100 is formed of plastic, e.g., a non-reactive plastic such as polypropylene (PP) or high-density polyethylene (HDPE). The container 100 can be manufactured by blow moulding, injection moulding, or rotation moulding. The material forming the container 100 can be treated at least in part with an antimicrobial material, e.g., as an additive in the material, or a surface coating on the interior and/or exterior of the container 100. The catchment surface can include a non-stick material on the exterior of the container 100 to substantially reduce adhesion of the fluid to the catchment surface.

The fluid can be a liquid, e.g., water, and the container can be a watering can. The container 100 can collect rain running from a roof, a down pipe or a tarpaulin, or shower water running in a shower. The fluid can be oil. The container can be used in a kitchen to collect hot liquids such as fats and grease, in a garage to collect liquids from a vehicle (e.g., radiator fluids, oil and brake fluid), in laboratories to collect chemicals (e.g., wastes, bases, solvents and acids), or in hospitals to collect hazardous fluids. The fluid can be a powder, or free-flowing particles, such as flour or breads.

The dimensions of the container can be chosen to define the external size of the container for purposes of convenient use, and to define a convenient volume held by the container. For example, a small-volume container can carry about one milliliter, and a large-volume container can carry about 100 liters. Preferably, the container is sized or dimensioned to hold between about 500 milliliters and about 20 liters, and more preferably between about 1 liter and about 10 liters to allow convenient manual use by a person, for example for collecting water in a shower and watering their garden. Particularly convenient volumes can be selected to be about 3 liters, about 5 liters and about 10 liters. An example container has a width (or "base length") of about 350 mm, a height (or "spout-side length") of about 400 mm and a base depth (or "base width") of about 120 mm.

In some embodiments, the container can include a filter, to filter the fluid, including a porous filter in the outlet. The filter can be selected for filtering a particular fluid, e.g., for filtering water, or oil.

The nozzle or spout can take a number of forms, as shown in FIGS. 14A to 14E, to provide the fluid outlet.

As described with reference to FIGS. 1 to 14A, the spout can include an inner spout opening 1006, which provides an entrance 1402A to the spout from the body void 1004 of the container 100. The spout can also include an outer spout opening 122 which provides an exit 1404A for fluid to be poured from the spout. The spout also includes the riser provided by the raised portion 1406A, which includes the entrance 1402A, which lies at least partially above the contained fluid level 1408 of fluid in the container 100 in the collecting orientation, as shown in FIGS. 14A-14E. The riser substantially resists fluid flow along the outlet channel when the container is in the collecting orientation.

In an alternative spout arrangement, as shown in FIG. 14B, the entrance 1402B is arranged below the fluid level 1408, and the exit 1404B included in the riser provided by a raised portion 1406B, which lies above the fluid level 1408.

In a further alternative arrangement of the spout, as shown in FIG. 14C, the spout is a C-shaped spout, with the riser provided by a raised portion 1406C between the entrance 1402C and the exit 1404C, lying at least in part substantially above the fluid level 1408 of the fluid in the prone condition.

Figure 14D:
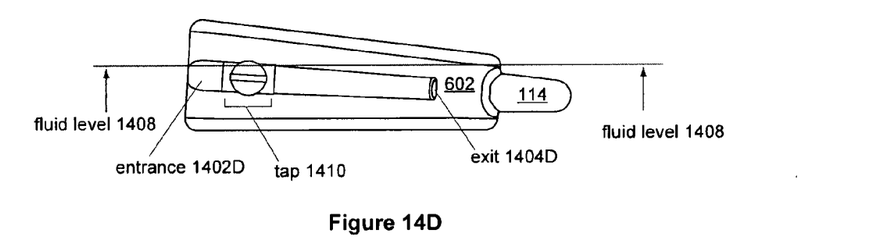
Figure 14E:
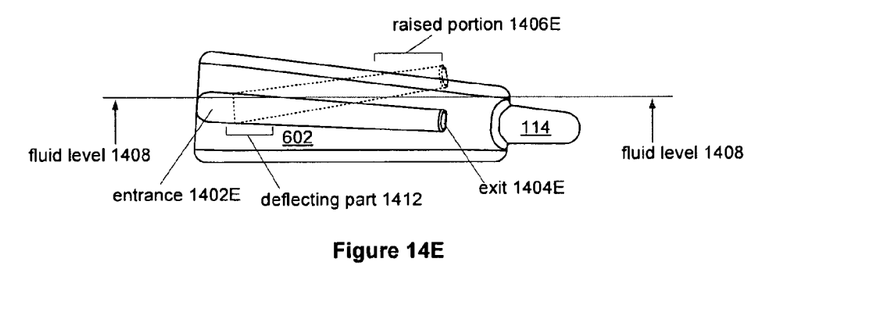

In a further alternative arrangement of the spout, as shown in FIG. 14D, the entire spout, including the entrance 1402D and the exit 1404D, lies generally below the fluid level 1408, with a closure mechanism provided by a tap 1410 which is manually moveable to close and substantially obstruct the spout during collection of the fluid, and to open and allow fluid flow along the spout during pouring. The tap 1410 can be a ball valve tap.

In a further arrangement of the spout, as shown in FIG. 14E, the exit 1404E is moveable between a lowered position, below the fluid level 1408, and a raised position above the fluid level 1408 as a consequence of the exit 1404E being part of a moveable raised portion 1406E defining the riser. The exit 1404E is moveable to be raised above the fluid level 1408 during collection of the fluid while in the prone condition. The entrance 1402E can lie below the fluid level 1408 because the raised portion 1406E substantially resists fluid flow along the spout. The raised portion 1406E is able to be moved by virtue of a deflecting part 1412 (also referred to as a "pivot mechanism") of the spout, which allows the exit 1404 of the spout to be moved between positions above and below the fluid level 1408. The deflecting part 1412 can include a flexible portion of the spout, e.g., a flexible pipe of plastic or rubber, or a sealed hinge.

An alternative fluid container 1500 has the same features as the fluid container 100 described with reference to FIGS. 1 to 14E, except where different features are described hereinafter with reference to FIG. 15.

Figure 15:
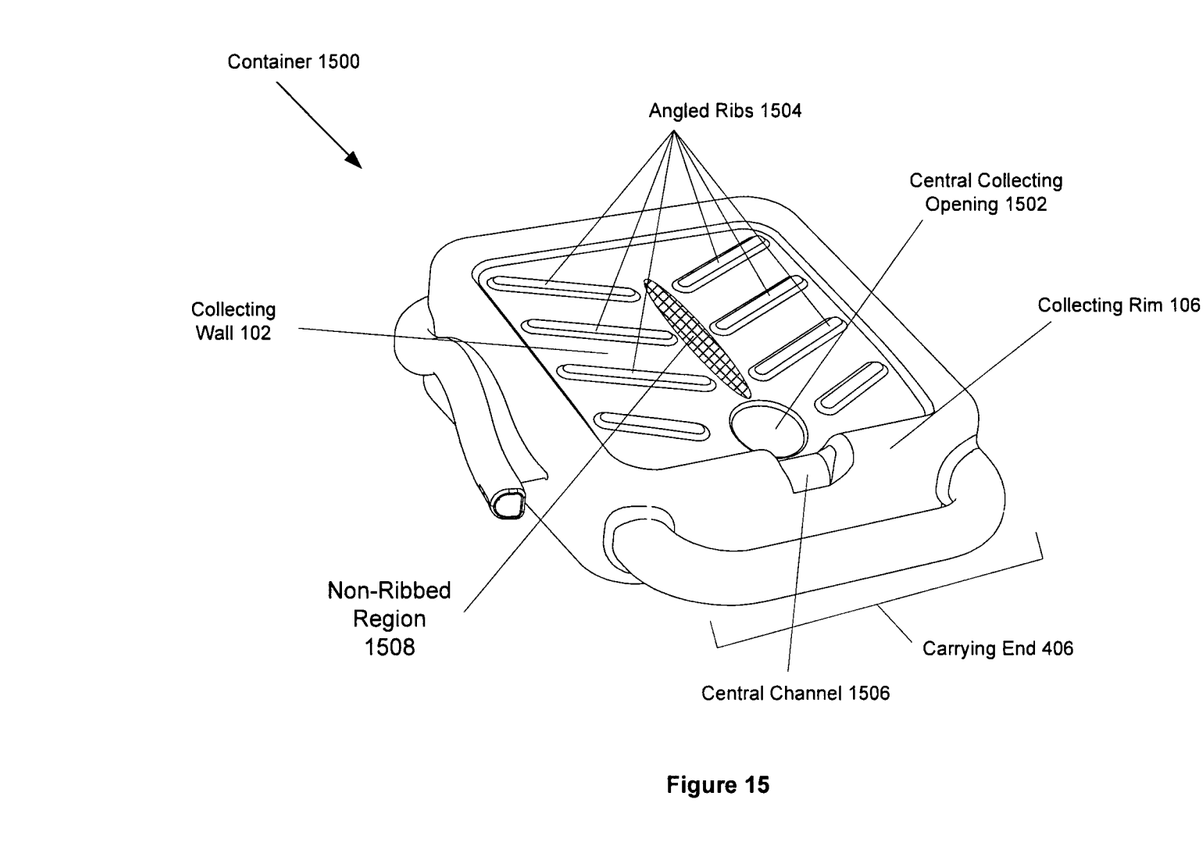
FIG. 15 is an auxiliary view of the container with alternative angled ribs and a C-shaped spout.

In the alternative fluid container 1500 the inlet, as shown in FIG. 15, is defined by a generally circular aperture, or hole, that provides a central collecting opening 1502, and is arranged generally centrally along the carrying end 406 of a container 1500. Having the central collecting opening 1502 located generally centrally can allow more convenient manufacture than when the collecting opening 108 is positioned in one corner of the collecting wall 102. The ribs can be in the form of angled ribs 1504, as shown in FIG. 15, which are angled to be aligned at least partially along a preferred flow direction of the fluid towards the inlet, and the central collecting opening 1502. The angled ribs 1504 are broken (i.e., non-continuous) and angled across the collecting surface, hence acting as a means of channelling the fluid toward the central collecting opening 1502 on the catchment surface.

In the alternative fluid container 1500, the ribs are positioned to provide a non-ribbed region 1508 along the central area of the collecting wall 102 which aligns along the direction of preferred fluid flow with the collecting opening 1502. The angled ribs 1504 act as baffles to direct fluid towards the collecting opening 1502, with the container 100 in the prone condition, and to slow fluid flow along the collecting wall 102 in directions defined by gravity that are not directly towards the collecting opening 1502. The angled ribs 1504 of the catchment surface are a form of a flow guide for directing the incident fluid on the catchment surface towards the inlet. The angled ribs 1504 can reduce problems associated with fluid flowing along the collecting wall 102 and spilling over the collecting rim 106 due to a high speed of flow, or due to the flow being insufficiently directed towards the collecting opening 1502. The centrally located collecting opening 1502 has a central spill-way channel 1506 formed in collecting rim 106 that corresponds to the channel 112 associated with the opening 108. The central spill-way channel 1506 is aligned with the central collecting opening 1502 to provide overflow for fluid when the container 100 is in the prone condition, as described with reference to the spill-way channel 112 and FIG. 11 hereinbefore.

Many modifications will be apparent to those skilled in the art without departing from the scope of the present invention.

PARTS LIST

| Part Number | Term |
|---|---|
| 100 | container |
| 102 | collecting wall |
| 104 | ribs |
| 106 | collecting rim |
| 108 | collecting opening |
| 110 | back side |
| 112 | spill-way channel |
| 114 | handle |
| 116 | carrying end |
| 118 | spout tube |
| 120 | spout base |
| 122 | outer spout opening |
| 124 | spout support |
| 202 | base side |
| 302 | collecting side |
| 402 | carrying end width |
| 404 | base width |
| 406 | carrying end |
| 408 | base end |
| 410 | non-spout-side wall |
| 502 | base length |
| 504 | spout-side length |
| 602 | spout-side wall |
| 702 | back wall |
| 704 | back rim |
| 802 | base wall |
| 804 | base recess |
| 806 | spout side |
| 808 | non-spout side |
| 810 | spout-side wall |
| 1002 | handle void |
| 1004 | body void |
| 1006 | inner spout opening |
| 1102 | incident direction |
| 1104 | ground or floor |
| 1106 | collecting direction |
| 1108 | fluid level |
| 1402A-E | entrance |
| 1404A-E | exit |
| 1408 | fluid level |
| 1410 | tap |
| 1412 | deflecting part |
| 1500 | alternative fluid container |
| 1502 | central collecting opening |
| 1504 | angled ribs |
| 1506 | central spill-way channel |
| 1508 | non-ribbed region |

The invention claimed is:

1. A container for fluid comprising:
an interior for containing a fluid;
an inlet in fluid communication with the interior for draining the fluid into the container when the container is in a prone position;
a collecting wall providing a catchment surface for collecting the fluid and for draining the fluid from an exterior of the container into the interior through the inlet to collect the fluid when the container is in the prone condition;
an outlet in fluid communication with the interior for draining the collected fluid from the container when the container is in a pouring condition, wherein the pouring condition is transverse the prone condition;
wherein the container is moveable from the prone condition to a carrying condition, and the carrying condition is transverse the prone condition,
wherein the inlet is positioned in the collection wall so as to be elevated above the collected fluid when the container is in the prone condition and the fluid has been collected,
wherein the inlet is positioned generally proximate an edge of the catchment surface so as to be elevated above the collected fluid when:
the fluid has been collected and the container is in the carrying condition; and
the fluid has been collected and the container is in the pouring condition,
wherein the catchment surface includes a catchment boundary for draining the fluid inward from at least one edge of the catchment surface,
wherein the catchment boundary includes a spill-way channel for draining residual fluid from the catchment surface away from the inlet when the container is in the prone condition,
the residual fluid lies on the catchment surface above the inlet when the container is in the prone condition,
the outlet includes a riser arranged so as to be elevated at least partially above the inlet in the prone condition, and so as to be lowered at least partially below the inlet in the pouring condition;
the riser is arranged so as to be elevated above the spill-way channel when the container is in the prone condition.

2. A container as claimed in claim 1, wherein the container includes a handle for moving the container from the prone condition to the carrying condition, wherein the inlet is positioned generally proximate the handle.

3. A container as claimed in claim 1, wherein the catchment surface includes a flow obstacle for slowing a flow of the fluid on the exterior of the container.

4. A container as claimed in claim 3, wherein the catchment surface includes a flow guide for directing the fluid towards the inlet on the exterior of the container.

5. A container as claimed in claim 4, wherein the catchment surface includes ribs that provide the flow obstacle and/or the flow guide.

6. A container as claimed in claim 1, wherein the catchment surface has a larger area than a base area of the container in the carrying condition.

7. A container as claimed in claim 6, wherein the container is generally wedge-shaped, with the base area being larger than an opposed carrying end area.

8. A container for fluid comprising:
an interior for containing a fluid;
an inlet in fluid communication with the interior for draining the fluid into the container when the container is in a prone position;
a collecting wall providing a catchment surface for collecting the fluid and for draining the fluid from an exterior of the container into the interior through the inlet to collect the fluid when the container is in the prone condition;
an outlet in fluid communication with the interior for draining the collected fluid from the container when the container is in a pouring condition, wherein the pouring condition is transverse the prone condition;
wherein the container is moveable from the prone condition to a carrying condition, and the carrying condition is transverse the prone condition,
wherein the inlet is positioned in the collection wall so as to be elevated above the collected fluid when the container is in the prone condition and the fluid has been collected,
wherein the inlet is positioned generally proximate an edge of the catchment surface so as to be elevated above the collected fluid when:
the fluid has been collected and the container is in the carrying condition; and
the fluid has been collected and the container is in the pouring condition, wherein the outlet includes a nozzle having a nozzle entrance in fluid communication with the interior of the container and a nozzle exit in fluid communication with the exterior of the container, and a riser arranged so as to be: elevated at least partially above the inlet in the prone condition, and lowered at least partially below the inlet in the pouring condition;

the riser includes a raised portion between the nozzle entrance and the nozzle exit when the container is in the prone condition, wherein the nozzle entrance is at a base end of the container so as to be below a collected fluid level when the fluid has been collected and the container is in the carrying condition; and wherein the nozzle exit is at the carrying end of the container so as to be above the collected fluid level when the fluid has been collected and the container is in the carrying condition.

9. A container according to claim 8, wherein the container includes:

a back wall opposite the collecting wall, wherein the nozzle entrance is arranged centrally between the collecting wall and the back wall.

10. A container as claimed in claim 9, wherein the collecting wall is rectangular.

* * * * *